(12) United States Patent
Djordjevic et al.

(10) Patent No.: US 8,743,984 B2
(45) Date of Patent: Jun. 3, 2014

(54) MULTIDIMENSIONAL HYBRID MODULATIONS FOR ULTRA-HIGH-SPEED OPTICAL TRANSPORT

(75) Inventors: Ivan B. Djordjevic, Tucson, AZ (US); Lei Xu, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 186 days.

(21) Appl. No.: 13/441,814

(22) Filed: Apr. 6, 2012

(65) Prior Publication Data

US 2012/0263466 A1 Oct. 18, 2012

Related U.S. Application Data

(60) Provisional application No. 61/476,363, filed on Apr. 18, 2011.

(51) Int. Cl.
*H04L 5/12* (2006.01)
(52) U.S. Cl.
USPC ........... 375/265; 375/260; 375/262; 375/267; 375/308
(58) Field of Classification Search
CPC ..... H04L 1/006; H04L 1/0054; H04L 1/0065; H04L 1/0041
USPC ............ 375/265, 260, 262, 267, 308; 398/65, 398/139, 135, 182, 200
See application file for complete search history.

(56) References Cited

U.S. PATENT DOCUMENTS 8,219,874 B2 * 7/2012 Djordjevic et al. ........... 714/755
8,509,581 B2 * 8/2013 Winzer et al. ................. 385/124
2004/0258177 A1 * 12/2004 Shen et al. .................... 375/308
2008/0163025 A1 * 7/2008 Djordjevic et al. ........... 714/755
2009/0285323 A1 * 11/2009 Sundberg et al. ............. 375/267

OTHER PUBLICATIONS

Y. Ma, Q. Yang, Y. Tang, S. Chen and W. Shieh, "1-Tb/s single-channel coherent optical OFDM transmission over 600-km SSMF fiber with subwavelength bandwidth access," Opt. Express 17, 9421-9427 (2009).
Y. Tang and W. Shieh, "Coherent optical OFDM transmission up to 1 Tb/s per channel," J. Lightw. Technol. 27, 3511-3517 (2009).
J. McDonough, "Moving standards to 100 GbE and beyond," IEEE Appl. & Practice 45, 6-9 (2007).
I. B. Djordjevic, M. Arabaci, and L. Minkov, "Next generation FEC for high-capacity communication in optical transport networks" J. Lightw. Technol. 27, 3518-3530 (2009).
H. G. Batshon, I. B. Djordjevic, L. Xu and T. Wang, "Modified hybrid subcarrier/amplitude/phase/polarization LDPC-coded modulation for 400 Gb/s optical transmission and beyond," Opt. Express 18, 14108-14113 (2010).
H. G. Batshon, I. B. Djordjevic, T. Schmidt, "Ultra high speed optical transmission using subcarrier-multiplexed four-dimensional LDPC-coded modulation," Opt. Express 18, 20546-20551 ( 2010).
H. G. Batshon, I. B. Djordjevic, L. Xu and T. Wang, "Multidimensional LDPC-coded modulation for beyond 400 Gb/s per wavelength transmission," IEEE Photon. Technol. Lett. 21, 1139-1141 (2009).

* cited by examiner

*Primary Examiner* — Dhaval Patel
(74) *Attorney, Agent, or Firm* — Joseph Kolodka; Akitaka Kimura

(57) ABSTRACT

Systems and methods are disclosed with a spatial-domain-based multi-dimensional coded-modulation scheme that improves dramatically OSNR sensitivity and tolerance to fiber nonlinearities by using D-dimensional signal constellations, where D=2(2+M)N. The factor 2 originates from two polarizations, 2+M electrical basis functions are selected (2 in-phase/quadrature channels and M pulse-position like basis functions), and N represents the number of orbital angular momentum (OAM) states used in FMFs/MMFs. For single mode fiber applications N is 1.

20 Claims, 6 Drawing Sheets

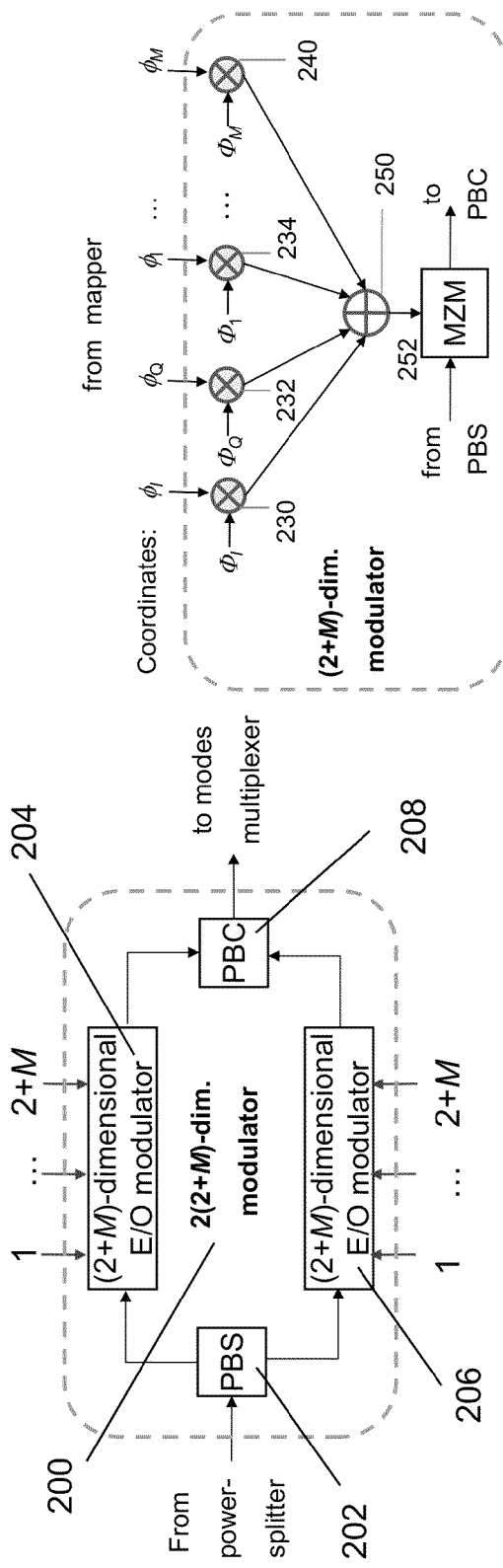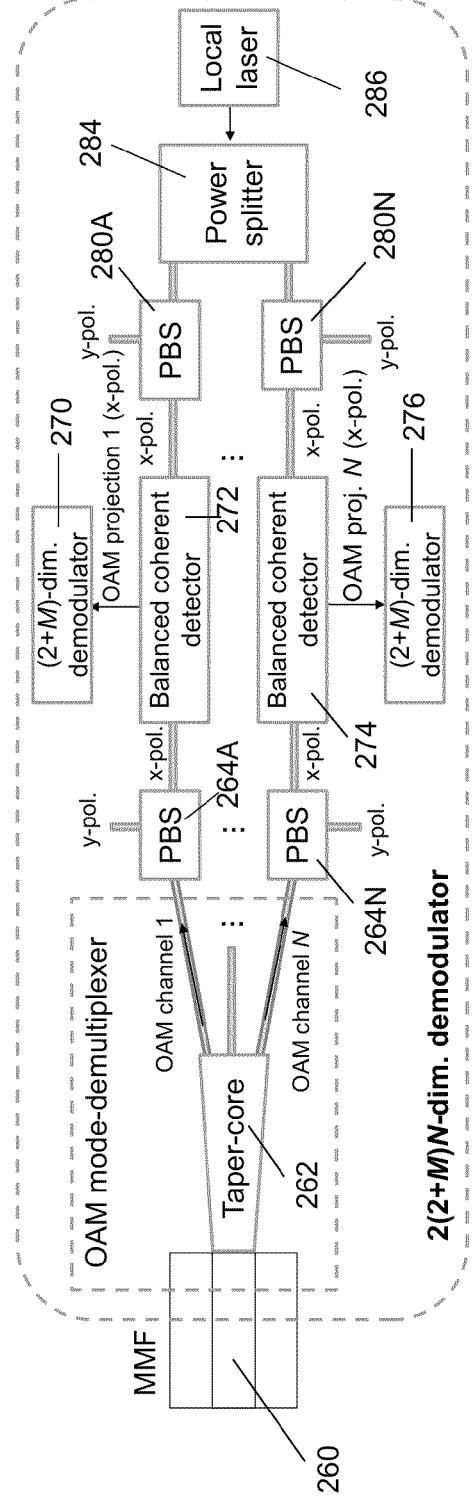
FIG. 1B
FIG. 1C

MULTIDIMENSIONAL HYBRID MODULATIONS FOR ULTRA-HIGH-SPEED OPTICAL TRANSPORT This application claims priority to Provisional Application Ser. No. 61/476,363 filed Apr. 18, 2011, the content of which is incorporated by reference.

The present invention relates to multi-dimensional hybrid modulations for ultra-high-speed optical transport.

BACKGROUND

The popularity of the internet has fundamentally changed the underlying information communication infrastructure, and has led to the worldwide telecom boom in the late 1990s and early 2000s. The volume of internet traffic continues to grow rapidly fueled by the emergence of new applications, thus increasing the demand for higher bandwidths. The exponential internet traffic growth projections place enormous transmission rate demand on the underlying information infrastructure at every level, from the core to access networks.

In order to satisfy high capacity demands, according to some industry experts, the 1 TbE standard should be completed in foreseeable future. Coherent optical OFDM is one possible pathway towards achieving beyond 1 Tb/s optical transport. Another approach is based on multidimensional coded modulation. Namely, by increasing the number of dimensions (i.e., the number of orthonormal basis functions), we can increase the aggregate data rate of the system without degrading the bit error rate (BER) performance as long as orthogonality among basis functions is preserved. Multidimensional signal constellations for optical communications have been used, but so far have been related to single carrier and SMF-based systems.

From Shannon's theory, information capacity is a logarithmic function of signal-to-noise ratio, but a linear function of the number of dimensions. By increasing the number of dimensions D the spectral efficiency can be dramatically improved. At the same time, in D-dimensional space (D>2) for the same average symbol energy the Euclidean distance between signal constellation points can be increased when compared to the conventional in-phase (I)/quadrature (Q) two-dimensional signal-space. The four-dimensional space, with two coordinates being in-phase/quadrature components in x-polarization ($I_x$ and $Q_x$) and two coordinates being in-phase/quadrature components in y-polarization ($I_y$ and $Q_y$), has already been intensively studied.

SUMMARY

Systems and methods are disclosed with a spatial-domain-based multidimensional coded-modulation scheme that improves dramatically OSNR sensitivity by using D-dimensional signal constellations, where D=2(2+M)N.

In one implementation, to satisfy the ever increasing bandwidth demands, the system uses D-dimensional signaling (D>4) by employing all available degrees of freedom for conveyance of the information over a single carrier including amplitude, phase, polarization and orbital angular momentum (OAM). The system uses a D-dimensional hybrid modulation scheme because all available degrees of freedoms are used. The D-dimensional signal-constellation needed for D-dimensional signaling is obtained as the D-dimensional Cartesian product of a pulse-amplitude modulation (PAM) signal constellation. Another option is to obtain the higher dimension signal constellation as Cartesian product of several lower dimensions' ones. Finally, the signal constellations obtained by minimalizing symbol error probability, by minimizing mean square error of optimum source distribution representation or by maximizing mutual information can be used as well. Each polarization employs (2+M)-bases functions. For the use in single mode fiber (SMF) applications, the corresponding signal space is 2(2+M)-dimensional. When N orthogonal orbital OAM modes are used in few-mode fibers (FMFs), multimode fibers (MMFs) or multicore fibers, the overall signal space is a D=2(2+M)N-dimensional and spectral efficiency can be dramatically improved. In order to keep the receiver complexity reasonable low, the system can use 2(2+M)-dimensional signal-space and spatially-multiplexed N signal streams.

Advantages of the preferred embodiment may include one or more of the following. The spatial-domain-based multidimensional coded-modulation scheme improves dramatically OSNR sensitivity by using D-dimensional (D>2) signal constellations instead of conventional 2D constellations (QAM or PSK). The system uses D-dimensional constellations by employing two phase coordinates (I and Q) and M pulse-position like coordinates per single polarization. The overall signal space for SMF applications is 2(2+M)-dimensional, while for FMFs/MMFs applications the signal space is 2(2+M)N-dimensional. For the same average symbol energy of 2D constellation, the Euclidean distance is much larger resulting in much better BER performance. In other words, for the same target BER, OSNR penalty improvement of conventional 2D coded-modulation is large. In combination with quasi-cyclic binary/nonbinary LDPC codes of large girth, the system can achieve multi-Tb/s serial optical transmission for long-haul applications. Monte Carlo simulations have shown that a hybrid eight-dimensional (8D) coded modulation scheme outperforms its corresponding 4D counterpart by 3.97 dB at a bit error rate (BER) of $10^{-8}$ while outperforming its corresponding conventional polarization-multiplexed iterative polar quantization (IPQ)-based (this is an optimum 2D signal constellation in an ASE noise dominated scenario) counterpart by even a larger margin of 6.41 dB (also at the BER of $10^{-8}$). The scheme is a called multi-dimensional hybrid modulation scheme, and orthogonal basis functions are used as coordinates for multidimensional signaling. Finally, the scheme is applicable to both SMF and MMF/FMF links.

BRIEF DESCRIPTION OF THE DRAWINGS

FIGS. 1A-1D show an exemplary spatial-domain-based multidimensional hybrid coded-modulation system.

FIG. 2A shows an exemplary multidimensional hybrid LDPC-coded modulation transmitter, while

DESCRIPTION

A detailed description of the multidimensional hybrid coded-modulation approach to enable ultra-high-speed optical transport is discussed next. The coded-modulation approach employs all available degrees of freedom; namely, amplitude, phase polarization and OAM. For each polarization, the system employs the following M+2 basis functions $$\phi_j(t) = \frac{1}{\sqrt{T_s/M}} \text{rect}\left[\frac{t-(j-1)T_s/M}{T_s/M}\right]; \quad (1)$$

$$j = 1, \ldots, M;$$

$$\text{rect}(t) = \begin{cases} 1, & 0 \le t < 1 \\ 0, & \text{otherwise} \end{cases}$$

$$\Phi_I(t) = \sqrt{\frac{2}{T_s}} \cos(2\pi t/(T_s/M)), \quad (2)$$

$$\Phi_Q(t) = \sqrt{\frac{2}{T_s}} \sin(2\pi t/(T_s/M)),$$

where $T_s$ is the symbol duration. In addition, the system uses N orthogonal OAM states for modulation. Therefore, the corresponding signal-space is $2(2+M)N$-dimensional. By increasing the number of dimensions, i.e., the number of orthogonal OAM basis functions and/or number of pulse-position basis functions, the aggregate data rate of the system is increased while ensuring reliable transmission at these ultra-high speeds using capacity-approaching low-density parity-check (LDPC) codes. Apart from increasing the aggregate data rate, an $2(2+M)N$-dimensional space when compared to the conventional two-dimensional (2D) space can provide larger Euclidean distances between signal constellation points, resulting in improved bit-error rate (BER) performance.

Figure 1A:
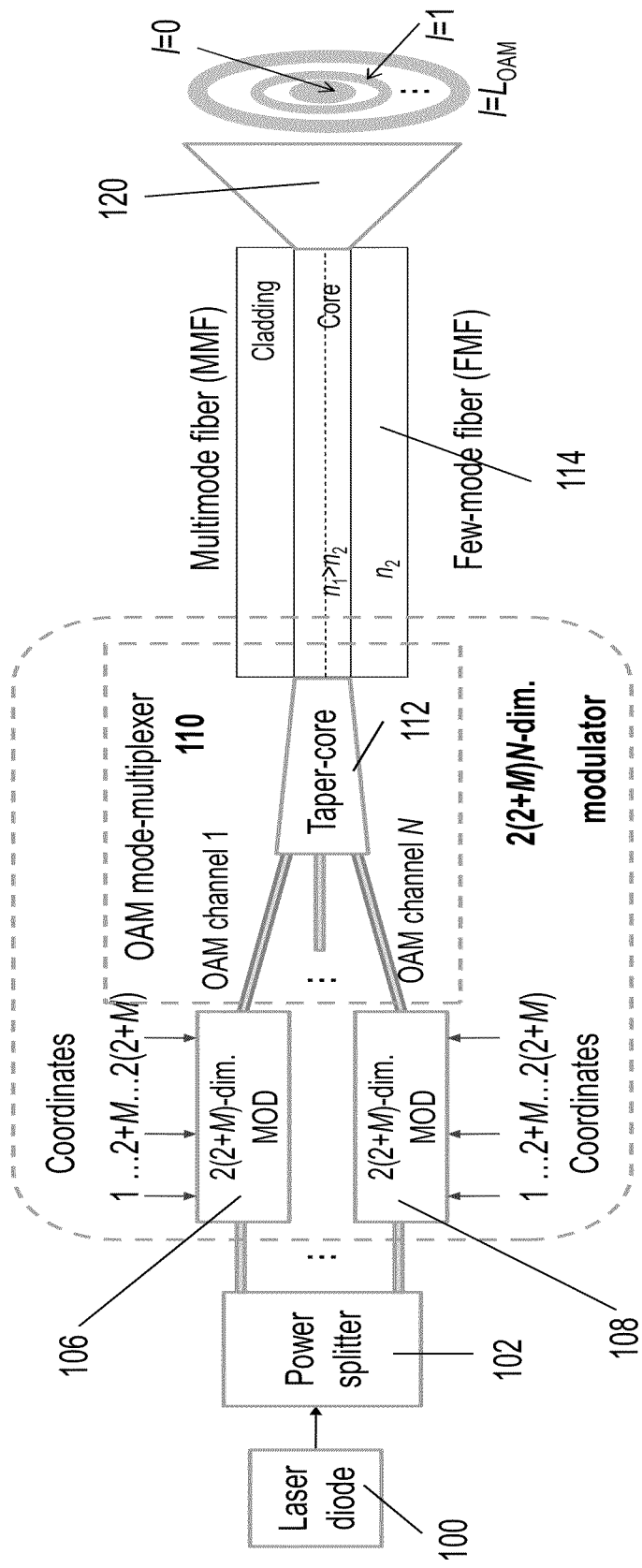
Figure 1D:
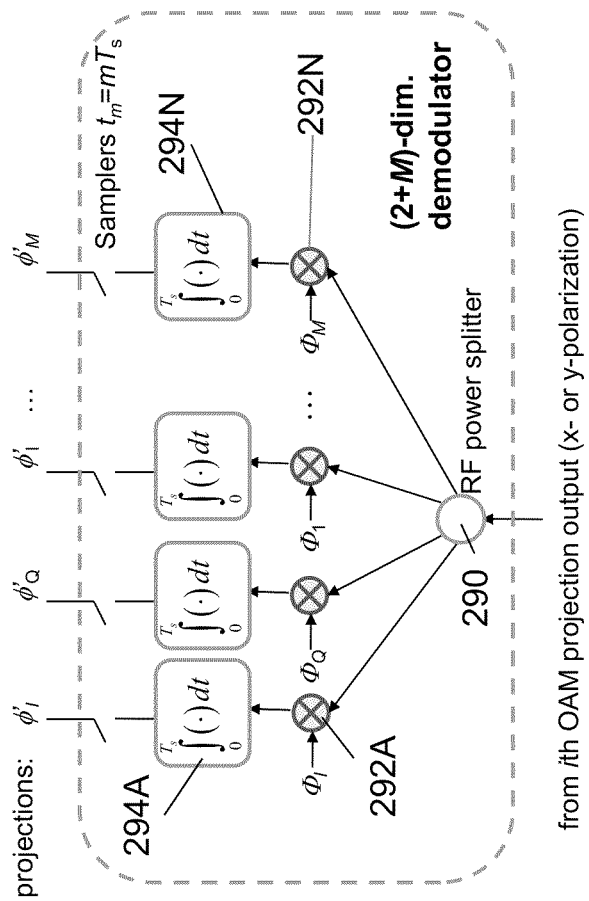

The overall system configuration is depicted in FIGS. 1A-1D, with FIG. 1A showing an exemplary transmitter configuration, FIG. 1B showing an exemplary $2(2+M)$-dimensional modulator configuration, FIG. 1C showing an exemplary $(2+M)N$-dimensional demodulator configuration, and FIG. 1D showing an exemplary $(2+M)$-dimensional demodulator configuration.

Turning now to FIG. 1A, an exemplary transmitter architecture is shown. A signal from a continuous wave laser diode 100 is split into N branches by using a power splitter 102 (such as 1:N star coupler) to feed $2(2+M)$-dimensional electro-optical modulators 106-108, each corresponding to one out of N OAM modes. The $2(2+M)$-dimensional electro-optical modulator 106 or 108 can be implemented as shown in FIG. 1B. The OAM mode multiplexer is composed of N waveguides, taper-core fiber and MMF/FMF, properly designed to excite orthogonal OAM modes in MMF/FMF. Namely, the azimuthal modes $u_{l,p}$, where $l=0, 1, \ldots, L_{CAM}$ for fixed p, which are illustrated in FIG. 1A, are mutually orthogonal as $$(u_{m,p}, u_{n,p}) = \int u_{m,p}^*(r, \phi, z) u_{n,p}(r, \phi, z) r\, dr\, d\phi \quad (3)$$

$$= \begin{cases} \int |u_{m,p}|^2 r\, dr\, d\phi, & n = m \\ 0, & n \ne m \end{cases};$$

$$m, n \in \{0, 1, \ldots, L_{OAM}\}$$

and can be used as basis functions for multidimensional signaling. (In (3), r denotes the radial distance, $\phi$ denotes the azimuthal angle and z denotes the propagation distance.) In addition, for $p=0$ the intensity of a Laguerre-Gaussian (LG) mode is a ring of radius proportional to $|l|^{1/2}$ and as such it can easily be detected by donut-shaped photodetector designed to capture the 1th mode.

In FIG. 1B, a $2(2+M)$-modulator 200 includes a polarization beam splitter (PBS) 202 that receives signals from a power splitter and drives electro-optical (E/O) modulators 204-206, whose outputs are then provided to a polarization beam combiner (PBC) 208 to mode multiplexer. In one embodiment, the $2(2+M)$-modulator 200 is composed of two $(2+M)$-dimensional modulators 204-206, one for each polarization, whose configuration is shown in the bottom half of FIG. 1B. The $(2+M)$-coordinates from the mapper are used as inputs to the modulator, properly multiplied by multipliers 230-240 with corresponding basis functions (see Eqs. (1,2)), combined in combiner 250 and after driver amplifier used as an RF input to a Mach-Zehnder modulator (MZM) 252. In one embodiment, the electrical portion of the modulator can be implemented as a DSP module followed by a digital-to-analog converter (DAC). The $(2+M)$-dimensional modulator outputs are combined into a single OAM stream by a polarization beam combiner (PBC). The N OAM streams, such obtained, are combined by the OAM mode-multiplexer as described above.

An exemplary $2(2+M)N$-dimensional demodulator architecture is shown in FIG. 1C. Data is communicated over a multimode fiber MMF/FMF 260 through a tapered-core 262. The system first performs OAM mode-demultiplexing in the OAM-demux block, whose outputs are $2(2+M)$-dimensional projections along N OAM states. The nth OAM projection is used as input to the polarization-beam splitter (PBS) 264A/264N. The x-(y-) polarization output is used as input to the balanced coherent detector 272-274 (the second input is the corresponding output that originates from a local laser 286, as shown in FIG. 1C), which in turn is provided to a PBS 28A/280N. A power splitter 284 receives signals from a local laser 286 and drives the outputs of all PBSes 280A-280N.

The balanced coherent detector provides the $(2+M)$-dimensional signal used as input to the corresponding demodulator, shown in FIG. 1D. The outputs of correlators, from FIG. 1D, provide projections along corresponding basis functions (given by Eqs. (1,2)). Instead of the bank of correlators the system can use a bank of matched filters. This particular version is suitable for DSP implementation. Namely, analog-to-digital conversion blocks can be used to perform the match filtering in digital domain followed by dot-product calculation among the received vector and candidate constellation point vectors. Such obtained projections are used as inputs of the corresponding a posteriori probability demapper (APP), as shown in FIG. 2B. The $(2+M)$-dimensional modulator (see FIG. 1B) can also be implemented in discrete-time (DT) domain, by multiplying the coordinates with DT version of basis functions, summing up the results of multiplications, performing oversampling and after digital-to-analog conversion of real and imaginary parts use them as I- and Q-inputs of an I/Q modulator.

Figure 2A:
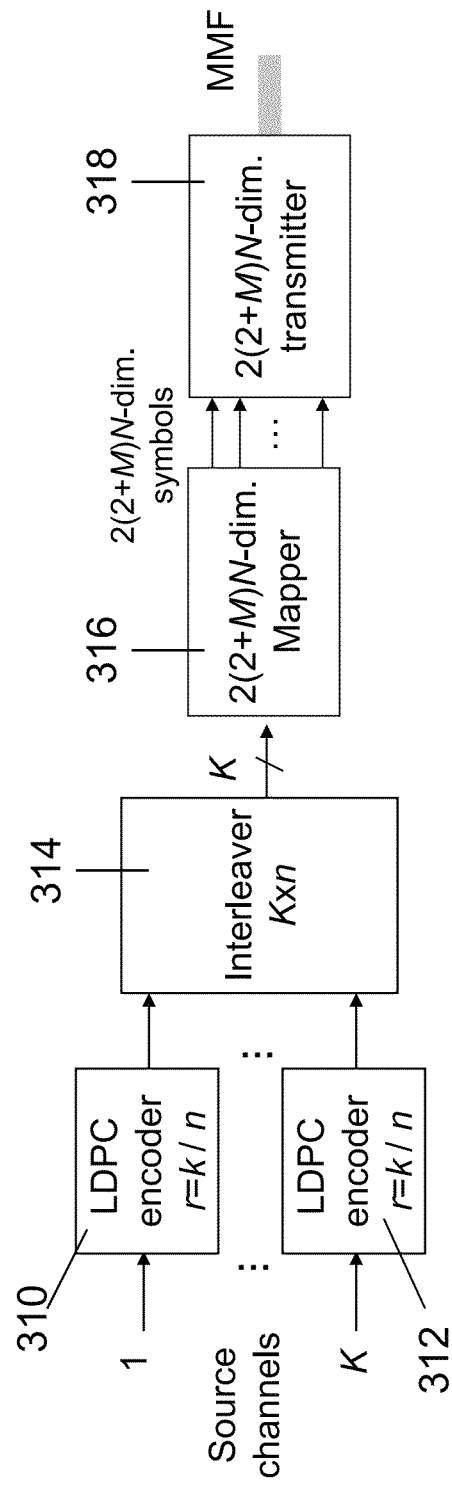
Figure 2B:
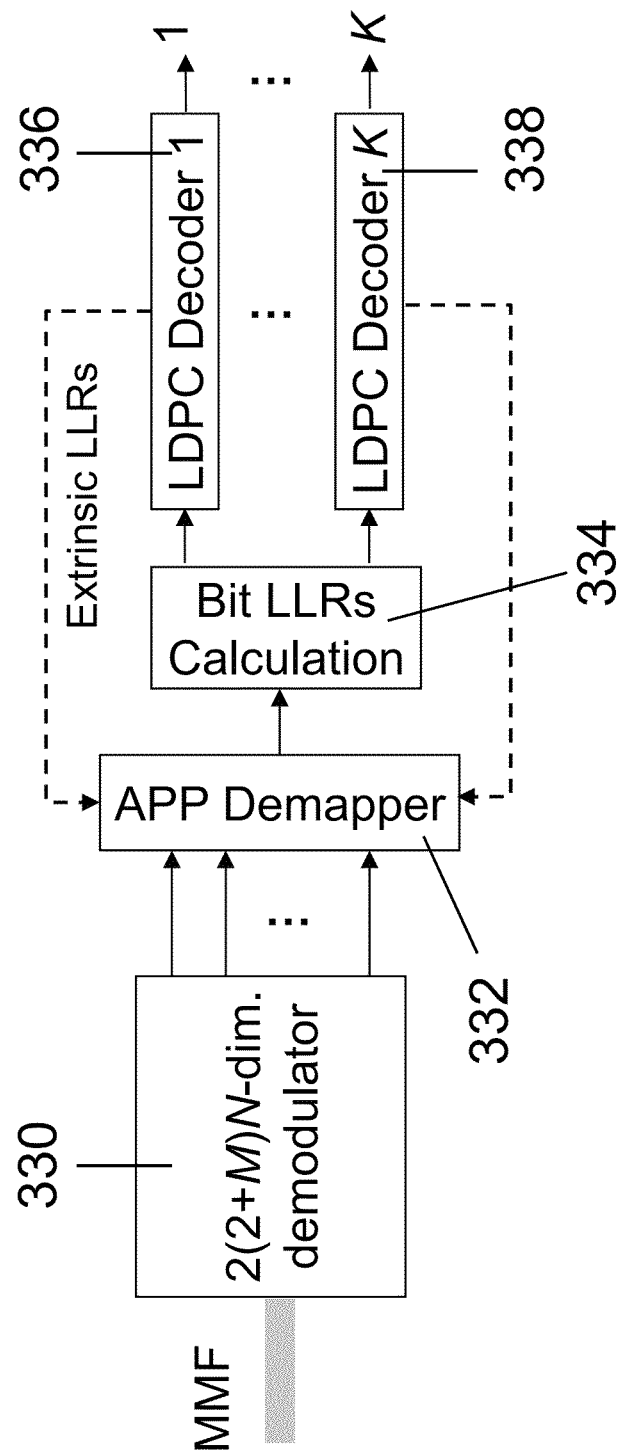
FIG. 2B shows corresponding receiver configurations.

After this description of transmitter and receiver architectures, the corresponding multidimensional coded-modulation scheme, shown in FIGS. 2A-2B, is discussed next.

As shown in FIG. 2A, K independent bit streams coming from different information sources are first encoded using binary (n,k) LDPC codes. The outputs of the encoders are then interleaved by a K×n block interleaver. The block interleaver accepts data from the encoders row-wise, and outputs the data column-wise to the mapper that accepts K bits at the time instance i.

The multidimensional mapper determines the corresponding $L^{2(2+M)N}$-ary signal constellation point, where L is the number of amplitude levels per dimension, using $$s_i = C_{2(2+M)N} \sum_{j=1}^{2(2+M)N} f_{i,j}\Phi_j. \quad (4)$$

In (4), the set $\{\Phi_1, \Phi_2, \ldots, \Phi_{(4+M)N}\}$ represents the set of $2(2+M)N$ orthonormal basis functions, $C_{2(2+m)N}$ is a normalization factor, and $f_{i,j}$ are signal-constellation coordinates obtained as elements of the $2(2+M)N$-dimensional Cartesian product of PAM signal constellation $$X^{2(2+M)N} = \underbrace{X \times X \times \ldots \times X}_{2(2+M)N \text{ times}} = \quad (5)$$
$$\{(x_1, x_2, \ldots, x_{2(2+M)N}) | x_d \in X, 1 \le d \le 2(2+M)N\},$$

where $x=\{2l-1-L| l=1, 2, \ldots, L\}$. Each coordinate of the D-dimensional mapper output, where $D=2(2+M)N$, is used as the corresponding RF input to the D-dimensional modulator (see FIG. 1a). Finally, the modulated signals are sent over the FMF/MMF/multicore fiber system of interest after being combined into an optical wave via a mode-multiplexer, which was discussed above (see FIG. 1A). Notice that the D-dimensional mapper is just a look-up-table (LUT), which can be implemented using single FPGA. In PDM-QAM, on the other hand, two LUTs are needed, one in each polarization. If somebody wants to use the OAM multiplexing, the number of required LUTs will be 2N. Therefore, the complexity of D-dimensional mapper is lower than that that of conventional OAM-multiplexed PDM-QAM.

The number of bits per signal constellation point is determined by) $\log_2(L^D)=K$. The dimensionality, D, can be adjusted according to the desired final rate, by varying the parameters M, N and L. The aggregate data rate (per single wavelength) is determined by $$\log_2(L^{2(2+M)N}) \frac{\text{ch. bits}}{\text{ch. sym.}} \times R_s \frac{\text{ch. sym.}}{s} \times r \frac{\text{info. bits}}{\text{ch. bits}}, \quad (6)$$

where r is the code rate, which is assumed to be equal for LDPC codes at each level, and $R_s$ is the symbol rate. For example, by setting the symbol rate to 12 GS/s, and the parameters, L, M, and N all to 4, the aggregate data rate is 1152 Gb/s (for r=1), which is compatible with 1 Tb/s Ethernet. Notice that the overall signal-space is 96-dimensional, so that the complexity of the receiver will be too high if Gaussian approximation for conditional probability density functions (PDFs) cannot be used. In this case, we can use a spatially-polarization-multiplexed (2+M)-dimensional system instead.

The aggregate data rate of this system is given by:

$$2N \times \log_2(L^{2+M}) \frac{\text{ch. bits}}{\text{ch. sym.}} \times R_s \frac{\text{ch. sym.}}{s} \times r \frac{\text{info. bits}}{\text{ch. bits}}, \quad (7)$$

which is essentially the same as that given by Eq. (6). For the same parameters as in the previous example, the spatially-polarization-multiplexed system achieves the same aggregate rate, while the corresponding signal space is 6-dimensional; and the receiver complexity is reasonable low even in the presence of nonlinearities (when Gaussian approximation is not valid).

The receiver configuration for coherent detection is depicted as in FIG. 2B. After D-dimensional demodulation, the corresponding projections are forwarded to the D-dimensional APP demapper. Notice that the hybrid D-dimensional coded-modulation scheme requires only one D-dimensional demapper, while conventional coded OAM-multiplexed PDM-QAM requires 2N two-dimensional APP demappers. In quasi-linear regime, when Gaussian approximation is sufficiently good, the complexity of D-dimensional receiver is significantly simpler than that of coded OAM-multiplexed PDM-QAM. The D-dimensional demapper provides the symbol log-likelihood ratios (LLRs), which are used by the bit LLR calculation block to compute bit LLRs required for iterative decoding in binary LDPC decoders. To improve the overall system performance, extrinsic information between LDPC decoders and the APP demapper is iterated until convergence or until a predetermined number of iterations has been reached. Finally, the outputs of the K binary LDPC decoders are provided to the user as the estimates of the K information streams sent by the transmitter. Another difficulty for coded OAM-multiplexed PDM-QAM is that extrinsic information needs to be iterated between LDPC decoders and 2N APP de-mappers, which further increases the silicon area in ASIC implementation, compared to single D-dimensional APP demapper.

From the description of the transmitter and the receiver set-ups, the system is scalable to any number of dimensions with small penalty in terms of BER performance, as long as the orthonormality among basis functions is preserved. The orthogonality among OAM modes in realistic multimode/multicore fibers can be re-established by considering fiber as N×N MIMO systems. Because OAM modes are orthogonal to each other, the problem of OAM coupling can be solved in similar fashion as it was done with PMD in PDM-QAM systems with SMF links, by considering the problem as a 2×2 MIMO system. To test the fundamental limits of the scheme, perfect compensation of OAM crosstalk is assumed in the analysis. Further, the analysis assumes that the MMF-EDFA can be implemented by OAM mode demultiplexing, independently amplifying each of OAM mode, and multiplexing them back into a single optical signal. Moreover, the scheme is applicable in both SMF, in which case N=1, and MMF links, when N>1. As already mentioned above, the increase in the number of dimensions leads to an increase in complexity, and hence, a compromise between the desired aggregate rate and the receiver complexity should be made in practice. The spectral efficiency of the D-dimensional scheme, where D=2(2+M)N, is $$\frac{S_E^{PDM-D-dim.}}{S_E^{PDM-QAM}} = \frac{\log_2 L^D}{2\log_2 M_{QAM}} = \frac{D\log_2 L}{2\log_2 M_{QAM}} \quad (8)$$

times better than that of QAM. In (8), $M_{QAM}$ is the QAM signal constellation size. Therefore, for the same number of amplitude levels per dimension ($M_{QAM}=L^2$), the spectral efficiency of the scheme is (D/4)-times better than that of QAM. For example, for M=N=L=2 (D=16) and $M_{QAM}=L^2=4$, the spectral efficiency of scheme is 4 times better. (The comparison is, therefore, performed for the same number of amplitude levels per dimension.)

Figure 3:
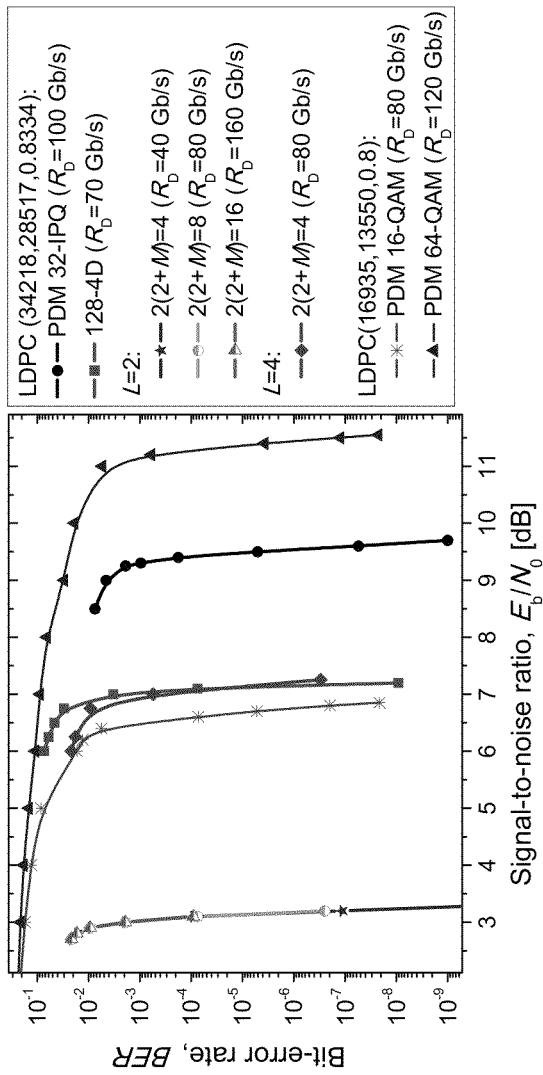
FIG. 3 shows simulated BER performance of the 2(2+M)-dimensional LDPC-coded modulation schemes per single OAM mode.

Next, an evaluation of the BER performance of the hybrid multi-dimensional coded-modulation scheme is done with Monte Carlo simulations. The results of simulations are summarized in FIG. 3, which are obtained for radial mode p=0 and either two or four azimuthal modes. In simulations, the exemplary OAM multiplexer (demultiplexer) shown in FIG. 1A and FIG. 1C is used. The results of simulations are obtained in a back-to-back configuration to explore the fundamental limits of the hybrid D-dimensional coded-modulation scheme. For transmission over MMFs, the system employs the MIMO approaches to restore the orthogonality of OAM modes. The residual, uncompensated, OAM crosstalk can be modeled by invoking the central limit theorem, and the bit SNR from FIG. 3, in this situation, the system will represent the signal-to-noise-and-OAM crosstalk ratio, SNCR. The SNCR can be related to SNR by $$SNCR \text{ [dB]} = 10 \log_{10}\left(\frac{E_b}{N_0 + N_x}\right) = SNR \text{ [dB]} - 10 \log_{10}\left(1 + \frac{N_x}{N_0}\right), \quad (9)$$

$$SNR \text{ [dB]} = 10 \log_{10}\left(\frac{E_b}{N_0}\right),$$

where $E_b$ is the bit energy, $N_0$ is the power spectral density (PSD) of noise, while $N_x$ is the PSD of OAM crosstalk. A spatially-multiplexed 8D coded modulation scheme, obtained by setting L=M=2, and $R_s$=12.5 GS/s for N=4 OAM modes, outperforms its corresponding 4D counterpart by 3.97 dB at the bit error rate (BER) of $10^{-8}$. The improvement of the scheme obtained by setting L=2, M=2 over conventional PDM 64-QAM, of lower aggregate data rate, is indeed striking 8.275 dB at BER of $2\times10^{-8}$! The aggregate data rate of this scheme is 400 Gb/s, which is compatible with next generation Ethernet. Notice that the aggregate data rate of 4D scheme is only 4×12.5 Gb/s. The same scheme outperforms its corresponding optimum PDM IPQ-based counter-part by even a larger margin of 6.41 dB (also at the BER of $10^{-8}$). The scheme with parameters L=2, M=0 outperforms the conventional PDM 16-QAM scheme (having the same number of constellation points) by 3.589 dB at a BER of $2\times10^{-8}$. By increasing the number of dimensions to 16, FIG. 3 shows that the BER performance loss compared to D=8 case is negligible, provided that orthogonality among basis functions is preserved. By setting L=4, M=2, and $R_s$=12.5 for N=5 OAM modes, the aggregated data rate of the spatially-multiplexed 16-dimensional coded-modulation scheme is 1 Tb/s. Therefore, the D-dimensional hybrid coded-modulation scheme is both 400 Gb/s and 1 Tb/s Ethernet enabling technology, while employing mature 10 Gb/s technology to perform encoding, decoding and DSP. Because the operating symbol rate is 12.5 GS/s, this scheme is much more suitable than previous proposals, including recent 100 G standard (IEEE 802.3ba), which is based on 25 GS/s effective information symbol rate.

In sum, the use of 2(2+M)N-dimensional modulation supports the next generation Ethernet enabling technology. The system employs two phase and M pulse-position basis functions per polarization. In addition, N orthogonal OAM modes are used as basis functions. The resulting signal space is 2(2+M)N-dimensional. The spectral efficiency of the scheme is significantly higher than that of QAM or PPM. For example, the spectral efficiency of D-dimensional scheme, where D=2 (2+M) N, is $$\frac{S_{E,D-dim.}}{S_{E,PPM}} = \frac{\log_2 L^D/(M/T_s)}{\log_2 M_{PPM}/(M_{PPM}/T_s)} = \frac{D\log_2 L/M}{\log_2 M_{PPM}/M_{PPM}}$$

times better than that of PPM. Using too many dimensions increases the receiver complexity. To reduce the receiver complexity, the spatially-polarization-multiplexed (2+M)-dimensional scheme is used instead. The overall aggregate data rate of both schemes is given by:

$$2N \times \log_2(L^{2+M}) \frac{\text{ch. bits}}{\text{ch. sym.}} \times R_s \frac{\text{ch. sym.}}{s} \times r \frac{\text{info. bits}}{\text{ch. bits}},$$

where r is the code rate, and Rs is the symbol rate. For the same average symbol energy of 2D constellation, the Euclidean distance of multidimensional coded-modulation scheme is much larger resulting in much better BER performance. In other words, for the same target BER, OSNR penalty improvement of conventional 2D coded-modulation is large.

The D-dimensional signaling (D>4) employs all available degrees of freedom for transmission over a single carrier including amplitude, phase, polarization and orbital angular momentum (OAM). The hybrid D-dimensional modulation employs all available degrees of freedom. The hybrid 8D coded-modulation scheme outperforms its 4D counterpart by 3.97 dB at BER of $10^{-8}$, while outperforming its corresponding polarization-division multiplexed (PDM) iterative polar quantization (IPQ)-based counterpart by even a larger margin of 6.41 dB (at the same BER). The improvement of the scheme for L=2 and M=2 over conventional PDM 64-QAM is indeed striking 8.28 dB at BER of $2\times10^{-8}$.

The D-dimensional coded-modulation system with D=2 (2+M)N offers one or more of the following advantages:
A. The D-dimensional coded-modulation improves dramatically OSNR sensitivity by using D-dimensional signal constellations instead of conventional 2D constellations (QAM or PSK).
B. With scheme transmission distances beyond 2000 km at ultra-high spectral efficiency (>15 bits/s/Hz) are possible.
C. In combination with quasi-cyclic binary/nonbinary LDPC codes of large girth, the system can achieve beyond multi-Tb/s serial optical transmission for long-haul applications.
D. The coded-modulation scheme employs D-dimensional signal constellations. Therefore, for the same average symbol energy of 2D constellation, the Euclidean distance is much larger resulting in much better BER performance.
E. For the same target BERs, the OSNR penalty improvement over polarization-multiplexed QAM is large.
F. The scheme uses D-dimensional constellations by employing: two phase and M pulse position basis functions per polarization. In addition, N orbital angular momentum (OAM) states as basis functions are used. The resulting space is therefore, D=2(2+M)N-dimensional.

The above system achieves the high potential of multidimensional signal constellations where OAM modes are successfully excited in MMFs through the use of 2(2+M)N-dimensional modulation as the next generation Ethernet enabling technology.

The 8D coded-modulation scheme outperforms its corresponding 4D counterpart by 3.97 dB at the BER of $10^{-8}$, while outperforming its corresponding conventional PDM IPQ-based counterpart by even a larger margin of 6.41 dB (at the same BER). The improvement of the scheme obtained for L=2, M=2 over conventional PDM 64-QAM, of lower aggregate data rate, is even 8.275 dB at BER of $2\times10^{-8}$! In terms of complexity, the D-dimensional scheme requires one LUT to implement D-dimensional mapper, while the corresponding OAM-multiplexed PDM-QAM counterpart requires 2N two-dimensional LUTs. On receiver side, the scheme requires one D-dimensional APP demapper, while the OAM-multiplexed PDM-QAM counterpart requires N two-dimensional APP de-mappers.

Therefore, in quasi-linear regime when Gaussian approximation is sufficiently good, the complexity of the scheme is significantly lower than that of the OAM-multiplexed PDM- QAM. The system is very flexible, it can be used in both: (i) SMF links in which case we set N=1, meaning that the corresponding signal space is 2(2+M)-dimensional; and (ii) MMF/FMF links in which case N>1, meaning that the signal space is 2N(2+M)-dimensional. The scheme can be used as a 2N(2+M)-dimensional modulation scheme or as a multiplexing scheme in which N OAM streams, each carrying 2(2+M)-dimensional signal streams are multiplexed together. The particular choice of parameters depends on the application of interest.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for optical communications, the method comprising
    a. using a 2(M+2)-dimensional signal-space for single-mode fiber applications, with two phase coordinates (I and Q) and M pulse-position like coordinates per single polarization; and
    b. alternatively using a D=2(2+M)N-dimensional space for few-mode fiber (FMF)/multimode fiber (MMF) applications, where the factor 2 originates from two polarizations, and N represents the number of orbital angular momentum (OAM) states used in FMF/MMF applications,
    wherein spectral efficiency improvement to pulse position modulation (PPM) can be expressed as $$\frac{S_{E,D-dim.}}{S_{E,PPM}} = \frac{\log_2 L^D/(M/T_s)}{\log_2 M_{PPM}/(M_{PPM}/T_s)} = \frac{D \log_2 L/M}{\log_2 M_{PPM}/M_{PPM}},$$

Where $S_{E,D-dim}$ is spectral efficiency for the D-dimensional space,
$S_{E,PPM}$ is spectral efficiency for the PPM,
L is the number of amplitude levels per dimension,
$M_{PPM}$ is the number of pulse-position like coordinates per polarization, and
$T_s$ is a symbol duration, and wherein M and N are integers, M≥1, and N≥1.

2. The method of claim 1, comprising applying the D-dimensional constellations with two phase and M pulse position basis functions per polarization.

3. The method of claim 2, comprising using N orbital angular momentum (OAM) states as basis functions to form a resulting signal space D=2(2+M)N-dimensional.

4. The method of claim 1, wherein for the same average symbol energy of 2D constellation, the proposed scheme provides a large Euclidean distance among constellation points to improve OSNR sensitivity.

5. The method of claim 1, comprising communicating data while tolerating fiber nonlinearities.

6. The method of claim 1, comprising using quasi-cyclic binary or non-binary LDPC codes with a large girth to provide multi-terabits per second serial optical transmission for long-haul applications.

7. The method of claim 1, comprising communicating with an aggregate data rate (per single wavelength) determined by:

$$\log_2(L^{2(2+M)N})\frac{\text{ch. bits}}{\text{ch. sym.}} \times R_s \frac{\text{ch. sym.}}{s} \times r \frac{\text{info. bits}}{\text{ch. bits}},$$

where r is a code rate and $R_s$ is a symbol rate.

8. The method of claim 1, comprising using a spatially-polarization-multiplexed (2+M)-dimensional system to reduce the receiver complexity.

9. The method of claim 8, wherein an aggregate data rate of spatially-polarization-multiplexed (2+M)-dimensional system comprises:

$$2N \times \log_2(L^{2+M})\frac{\text{ch. bits}}{\text{ch. sym.}} \times R_s \frac{\text{ch. sym.}}{s} \times r \frac{\text{info. bits}}{\text{ch. bits}}.$$

10. The method of claim 1, comprising iterating extrinsic information between LDPC decoders and an APP demapper until convergence or until a predetermined number of iterations is reached and estimating information streams sent by a transmitter.

11. A system, comprising:
    one or more encoders;
    an interleaver coupled to the encoders;
    an 2(2+M)N-dimensional mapper coupled to the interleaver; and
    an 2(2+M) N-dimensional transmitter coupled to the 2(2+M) N-dimensional mapper,
    wherein spectral efficiency improvement to pulse position modulation (PPM) can be expressed as $$\frac{S_{E,D-dim.}}{S_{E,PPM}} = \frac{\log_2 L^D/(M/T_s)}{\log_2 M_{PPM}/(M_{PPM}/T_s)} = \frac{D \log_2 L/M}{\log_2 M_{PPM}/M_{PPM}},$$

where $S_{E,D-dim}$ is spectral efficiency for the D-dimensional space,
$S_{E,PPM}$ is spectral efficiency for the PPM,
L is the number of amplitude levels per dimension,
$M_{PPM}$ is the number of pulse-position like coordinates per polarization, and
$T_s$ is a symbol duration, and wherein M and N are integers, M≥1, and N≥1.

12. The system of claim 11, comprising a multi-mode fiber/few-mode fiber coupled to the 2(2+M) N-dimensional transmitter.

13. The system of claim 12, comprising a receiver coupled to the 2(2+M) N-dimensional transmitter.

14. The system of claim 13, comprising a 2(2+M) N-dimensional demodulator coupled to a multi-mode fiber/few-mode fiber.

15. The system of claim 14, comprising an a posteriori probability (APP) demapper coupled to the 2(2+M) N-dimensional demodulator to provide symbol log-likelihood ratios (LLRs).

16. The system of claim 14, comprising a bit LLR calculation block to determine bit LLRs required for iterative decoding in binary LDPC decoders.

17. The system of claim 16, comprising one or more Low-density parity-check (LDPC) decoders coupled to the bit LLR calculation block.

18. The system of claim 17, comprising a controller to iterate extrinsic information between the LDPC decoders and APP demapper until convergence or until a predetermined number of iterations has been reached.

19. The system of claim 16, wherein the outputs of K LDPC decoders are provided as estimates of the K information streams sent by the transmitter.

20. A system, comprising:
one or more encoders;
an interleaver coupled to the encoders;
an 2(2+M)N-dimensional mapper coupled to the interleaver;
an 2(2+M) N-dimensional transmitter coupled to the 2(2+M) N-dimensional mapper;
a multi-mode fiber/few-mode fiber coupled to the 2(2+M) N-dimensional transmitter; and
a receiver coupled to the 2(2+M) N-dimensional transmitter, comprising:
 a 2(2+M) N-dimensional demodulator coupled to the multi-mode fiber/few-mode fiber;
 an a posteriori probability (APP) demapper coupled to the 2(2+M) N-dimensional demodulator to provide symbol log-likelihood ratios (LLRs);
 a bit LLR calculation block to determine bit LLRs required for iterative decoding in binary LDPC decoders; and
 one or more Low-density parity-check (LDPC) decoders,
wherein spectral efficiency improvement to pulse position modulation (PPM) can be expressed as $$\frac{S_{E,D-dim.}}{S_{E,PPM}} = \frac{\log_2 L^D/(M/T_s)}{\log_2 M_{PPM}/(M_{PPM}/T_s)} = \frac{D\log_2 L/M}{\log_2 M_{PPM}/M_{PPM}},$$

where $S_{E,D-dim}$ is spectral efficiency for the D-dimensional space,
$S_{E,PPM}$ is spectral efficiency for the PPM,
L is the number of amplitude levels per dimension,
$M_{PPM}$ is the number of pulse-position like coordinates per polarization, and
$T_s$ is a symbol duration, and wherein M and N are integers, M≥1, and N≥1.

* * * * *